Oct. 21, 1952 — C. A. STEEN — 2,614,730
BOILING PAN
Filed Aug. 7, 1947
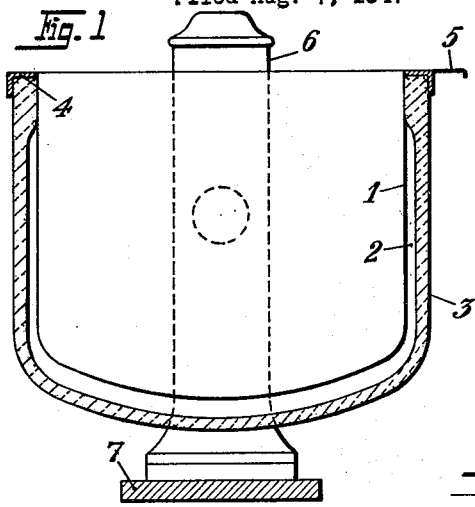
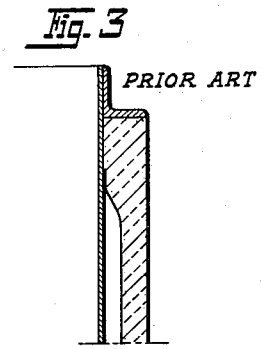
PRIOR ART
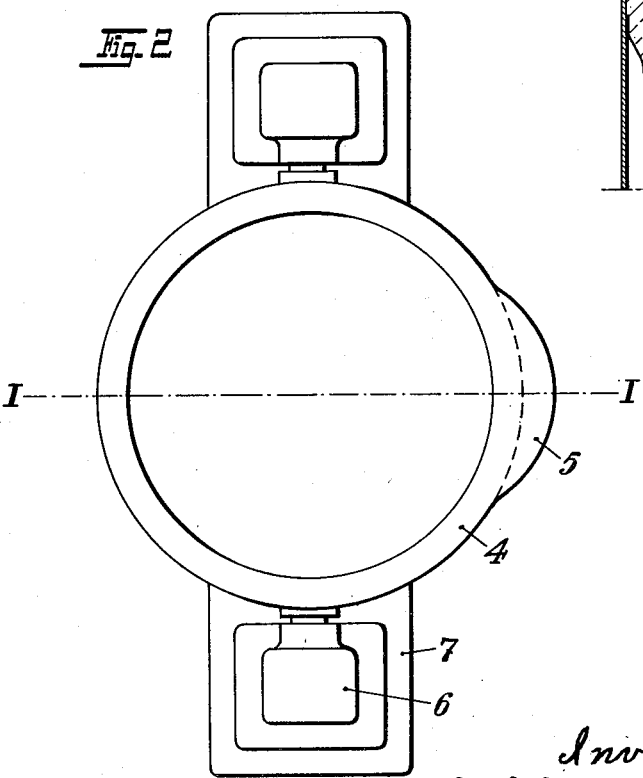
Inventor
Carl August Steen
by Sommers & Young
Attorneys Patented Oct. 21, 1952

2,614,730

UNITED STATES PATENT OFFICE 2,614,730

BOILING PAN

Carl August Steen, Getinge, Sweden

Application August 7, 1947, Serial No. 767,195
In Sweden January 24, 1940

Section 1, Public Law 690, August 8, 1946
Patent expires January 24, 1960

4 Claims. (Cl. 222—131)

The invention relates to a steam heated, tiltingly mounted boiling pan with an upper frame connected to the upper edge of an inner jacket.

When emptying pans of this kind into smaller vessels for distribution it has been difficult to obtain a sufficiently narrow stream and to prevent the liquid content of the pan from flowing along the outside of the pan onto the floor.

It is an object of the invention to cause the liquid content on tilting the pan to leave the pan in a narrow, coherent stream and to make it possible to empty also the biggest boiling pan in small vessels.

Another object is to cause the liquid content on tilting the pan to leave the same with so great velocity, also at the beginning and at the end of the emptying operation, that the liquid does not follow the pan wall.

Still another object is to provide a rigid base for a plane pouring lip in order to reduce the radial extension of said lip.

A form of execution of the invention is illustrated on the accompanying drawing on which:

Figure 1 is a vertical section on the lines 1—1 of Fig. 2 and

Figure 2 is a plan view of a boiling pan.

Figure 3 is a partial section of the emptying portion of a tiltingly mounted construction according to prior art.

The pan comprises an inner jacket 1 of stainless steel and an outer casing 3 forming an insulating layer on an outer jacket. The two jackets are welded together along the upper edge of the outer jacket, and between them is a steam space 2. A frame or reinforcement ring 4 is formed of an angle iron having one flange plane and horizontal, and the inner edge thereof is welded together with the edge of the inner jacket 1. The other flange is directed downwards and forms a cylinder surrounding and protecting the edge of the insulating layer.

The pan is journalled by two pivots in columns 6 on a base plate 7 and may be tilted by any suitable means not shown on the drawing.

A plane lip 5 may be united with the frame 4 by welding in any suitable manner and forms together with the adjacent part of the upper surface of the frame a smooth and plane surface. The lip may also be made as an integral part of a metal sheet covering the upper surface of the frame.

When using a pan according to the known construction shown in Figure 3, where the angle iron forms a step, it is obvious that a free jet may be obtained only if the pan is tilted so rapidly that a very heavy stream with a considerable breadth is formed. The content can in this case be collected only in wide vessels, and in the beginning and at the end of the emptying operation the content will flow along the side wall of the pan. According to the invention the velocity of the water running over the plane surface will increase from the moment when the water enters the plane surface until it leaves the same, and the water thereby leaves the surface without following the side wall or a bent down drip moulding. When emptying the pan the stream lines in the upper layer of the water in the pan are found to converge towards the part of the edge, where the water enters the plane surface, and during the running over this surface the outer parts of the flowing water cause a lateral narrowing of the stream, whereby its original breadth is considerably reduced until the water leaves the lip. This contraction continues also in the free jet, and although the stream originally may have a breadth of, for instance, five inches it has been possible to collect the jet in a bottle.

It is of advantage that the surface is as plane and smooth as possible, and the reinforcement ring therefore prevents a deformation of this surface whether or not the ring is covered by a sheet surface.

In order to obtain the necessary contraction of the stream the radial extension of the plane streaming path should be at least one tenth of the diameter of the inner jacket but is preferably about one eighth.

I claim:

1. In a steam heated, tiltingly mounted boiling pan, inner and outer jackets spaced apart and enclosing a steam space therebetween, an upper frame connected to the upper edge of said inner jacket and having an upper plane and ring-shaped surface extending outwardly from said upper edge of said inner jacket, a plane pouring lip secured to said frame and extending beyond the outer surface of the pan a smooth and plane surface of such a radial extension, at least $\tfrac{1}{10}$ of the diameter of the inner jacket, that the liquid content on tilting the pan is contracted on said smooth surface to form a narrow, coherent stream.

2. In a stem heated, tiltingly mounted boiling pan, inner and outer jackets spaced apart and enclosing a steam space therebetween, an upper frame connected to the upper edge of said inner jacket and forming a ring of an angle iron having an upper, plane flange and an outer, downwardly directed flange extending outwardly from said upper edge of said inner jacket, a plane pouring lip secured to said frame and extending beyond the outer surface of the pan, said lip forming with said upper flange a smooth and plane surface of such a radial extension, at least $\frac{1}{10}$ of the diameter of the inner jacket, that the liquid content on tilting the pan is contracted on said smooth surface to form a narrow, coherent stream.

3. In a steam heated, tiltingly mounted boiling pan, inner and outer jackets spaced apart and enclosing a steam space therebetween, an upper frame connected to the upper edge of said inner jacket and having an upper, plane and ring-shaped surface extending outwardly from said upper edge of said inner jacket, a sheet metal ring secured to and covering the upper surface of said frame, said sheet metal ring having a plane pouring lip extending beyond the outer surface of the pan, said sheet metal ring inclusive of said pouring lip forming a smooth and plane surface of such a radial extension, at least $\frac{1}{10}$ of the diameter of the inner jacket, that the liquid content on tilting the pan is contracted on said smooth surface to form a narrow, coherent stream.

4. In a steam heated, tiltingly mounted boiling pan, inner and outer jackets spaced apart and enclosing a steam space therebetween, an upper frame connected to the upper edge of said inner jacket and having an upper, plane and ring-shaped surface extending outwardly from said upper edge of said inner jacket, a plane pouring lip secured to said frame and extending beyond the outer surface of the pan, said lip having the outer edge bent downwards to form a drip moulding and forming with the upper surface of the pan a smooth and plane surface of such a radial extension, at least $\frac{1}{10}$ of the diameter of the inner jacket, that the liquid content on tilting the pan is contracted on said smooth surface to form a narrow, coherent stream.

CARL AUGUST STEEN.

REFERENCES CITED

The following references are of record in the file of this patent:

UNITED STATES PATENTS

| Number | Name | Date |
| --- | --- | --- |
| 625,607 | Rose | May 23, 1899 |
| 1,408,410 | Sidle | Feb. 28, 1922 |
| 1,457,614 | Brown | June 5, 1923 |
| 1,678,726 | Grant | July 31, 1928 |
| 1,918,117 | Martin | July 11, 1933 |
| 1,987,834 | Linthouse | Jan. 15, 1935 |
| 2,303,841 | Kircher | Dec. 1, 1942 |
| 2,323,904 | Geertsen | July 13, 1943 |